May 1, 1951  A. C. ABELT  2,550,750

DIFFERENTIAL FOR AUTOMOBILES

Filed Sept. 22, 1947

INVENTOR
ARTHUR C. ABELT

BY

ATTORNEYS

Patented May 1, 1951

2,550,750

UNITED STATES PATENT OFFICE 2,550,750

DIFFERENTIAL FOR AUTOMOBILES

Arthur C. Abelt, Richland Center, Wis.

Application September 22, 1947, Serial No. 775,454

1 Claim. (Cl. 74—711)

This invention appertains to gearing and more particularly to a novel differential especially adapted for use in motor vehicles for operating the aligned drive wheel axles thereof.

Due to the fact that one drive axle must turn faster than the other, when the vehicle is rounding a corner, much difficulty is experienced with all differentials that I am familiar with in that one wheel tends to spin on a slippery surface when the other wheel engages a firm surface.

It is, therefore, one of the primary objects of my invention to provide a novel differential for the aligned drive axles of motor vehicles which will automatically lock when either or both axles are driven from the propeller shaft, so that such axles will ordinarily be driven as a unit and which will automatically unlock when one axle and wheel turns faster than the other and the drive source such as when the vehicle turns a corner.

Another salient object of my invention is to provide a differential having a novel arrangement of gears, whereby the aligned drive axles are connected by two separate like trains of gearing, so that the rotation of one axle will be transmitted to the other axle when the vehicle is either in forward or reverse speeds.

A further important object of my invention is to provide a differential of the above character embodying helical gears so mounted and meshed that certain of the gears can be automatically slid laterally into locking engagement with the case of the differential to bring about the drive of the aligned axles as a single unit at the desired times.

A still further object of my invention is to provide an automobile differential of the above character which will be durable and efficient in use, one that will be simple and easy to manufacture and one which can be placed upon the market and incorporated with an automobile at a low cost.

With these and other objects in view, the invention consists in the novel construction, arrangement and formation of parts, as will be hereinafter more specifically described and claimed, and illustrated in the accompanying drawings, in which drawing:

Figure 1:
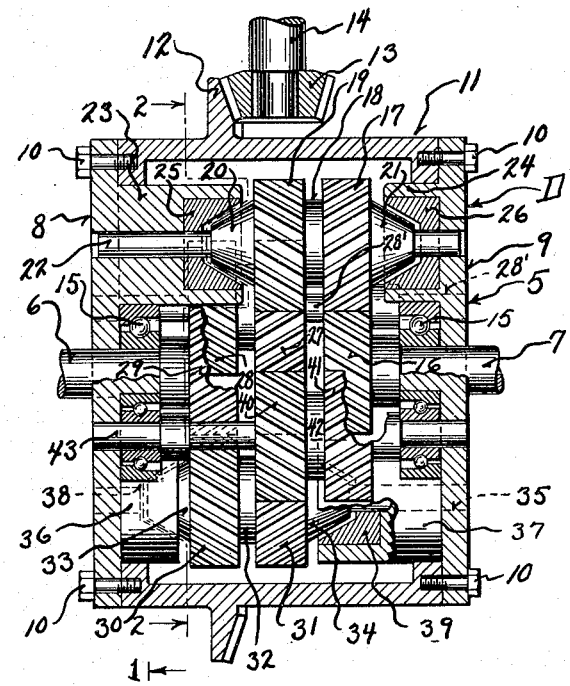
Figure 1 is a sectional view through my improved differential, the section being taken substantially on the line 1—1 of Figure 2 looking in the direction of the arrows.
Figure 2:
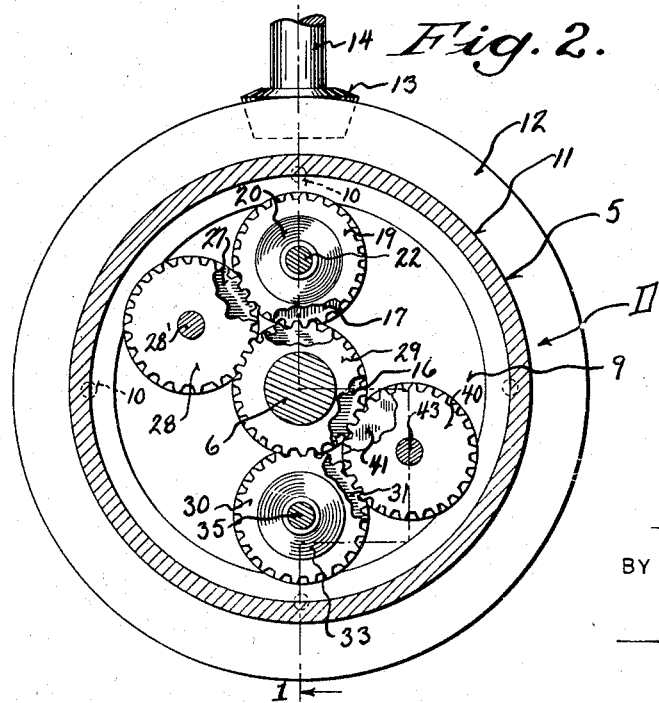
Figure 2 is a sectional view taken at right angles to Figure 1 and substantially on the line 2—2 of Figure 1, looking in the direction of the arrows.

Referring to the drawing in detail, wherein similar reference characters designate corresponding parts throughout the several views, the letter D generally indicates my improved differential, and the same includes a differential casing 5 for receiving the various drive gears, as will be later described, and the inner ends of the aligned drive axles 6 and 7 for the vehicle wheels. In ordinary practice the casing 5 and the axles 6 and 7 are rotatably mounted in a suitable housing (not shown).

The casing 5 can be constructed in any preferred and approved manner, and for the purpose of illustration, I have shown this casing as embodying disc shaped end walls 8 and 9 which are fastened by means of cap screws 10 to an outer cylindrical side wall 11. This wall has secured thereto or formed thereon a beveled ring gear 12, which has meshing therewith a beveled drive gear 13 keyed or otherwise fastened to a propeller shaft 14. This shaft 14 is driven from the power plant in the ordinary manner.

The end walls 8 and 9 of the case 5 are provided with aligned axial openings for receiving the inner ends of the drive axles 6 and 7, and these end walls can carry suitable bearings 15 for rotatably supporting said axles. The extreme end of the drive axle 7 has keyed or otherwise fastened thereto a helical gear or pinion 16, and this gear or pinion meshes with a similar helical gear or pinion 17. The gear 17 is carried by a hub 18 on which is secured for rotation with the gear 17, a helical gear 19. It is to be noted that the gears 17 and 19 have their teeth running in opposite directions. In other words, one of the gears is a right hand gear and the other is a left hand gear. The gears 17 and 19 and the hub 18 are mounted in a novel manner within the casing 5, and it is to be noted that the ends of the hub 18 have formed thereon friction hub cones 20 and 21. This unit, namely the gears 17 and 19, the hub 18 and the cones 20 and 21 is mounted for rotation with a shaft 22 rotatably and slidably mounted in the casing 5, as will now be described.

The inner faces of the end walls 8 and 9 of the casing 5 have formed thereon or secured thereto inwardly extending bosses 23 and 24 in which are mounted respectively cone socket locks 25 and 26. Normally, this unit is positioned, as shown in Figure 1, with the cones 20 and 21 out of frictional contact with the cone sockets 25 and 26. The shaft 22 is rotatably mounted in the end walls 8 and 9, the bosses 23 and 24 and the cone sockets 25 and 26, and the unit is mounted for lateral shifting so that the cone 20 can frictionally engage the socket 25, or so that the cone 21 can frictionally engage the cone socket 26. Mounted for rotary movement in the case but against lateral shifting are a pair of idle helical gears 27 and 28 having their teeth running in opposite directions. These gears 27 and 28 are mounted as a unit for rotation together and are mounted on a shaft 28', which is rotatably carried by the end walls of the case. The gear 27 meshes with the gear 19, and the gear 28 meshes at all times with a drive gear 29 of the helical type, which is secured for rotation with the axle 6. This constitutes one train of gear.

The helical gear 29 corresponds to the helical gear 16 on the axle 7.

Rotatably mounted in the case 5 as a unit are a pair of helical gears 30 and 31, and these gears have their teeth running in opposite directions, and are secured to a common hub 32. The ends of the hub have formed thereon or secured thereto outwardly extending cone locks 33 and 34. The hub with the gears 30 and 31 and the cones 33 and 34 are secured to a transversely extending shaft 35, which is rotatably and slidably mounted in the end walls 8 and 9 of the case. This unit, namely the gears 30 and 31, the hub 32, the cones 33 and 34 and the shaft 35, corresponds to the unit comprising the gears 17 and 19 etc. Formed on the inner faces of the side walls 8 and 9 are bosses 36 and 37, and these bosses in turn carry cone sockets 38 and 39. The unit including the gears 30 and 31 can shift laterally, so that the cone 33 can frictionally engage the cone socket 38 or shift laterally in the opposite direction, so that the cone 34 will frictionally engage the cone socket 39. Normally, the cones are out of frictional engagement with the sockets, as shown in Figure 1. The helical gear 29 on the shaft 6 is in constant mesh with the gear 30 on the shiftable unit. Also rotatably mounted in the case but against lateral shifting movement is a pair of like helical gears 40 and 41, and these gears also have their teeth running in opposite directions and are mounted on a common hub 42. The gears 40 and 41 are idle gears and are mounted on a shaft 43 rotatably mounted in suitable bearings carried by the side walls of the casing. The gear 31 of the shiftable unit meshes with the idle gear 40, and the idle gear 41 in turn meshes with the helical gear 16 carried by the axle 7. This constitutes the second train of gearing.

In operation of my differential, when the vehicle is being driven in a forward direction and the propeller shaft 14 is rotating in a counter-clockwise direction, then the gear case 5 will rotate in a clock-wise direction and carry the sets of gears 17 and 19 and 30 and 31 therewith. These gears meshing with the gears 16 and 29 (meshing gears 17 and 16 and meshing gears 29 and 30) will cause the gear set comprising the gears 17 and 19 to shift to the left, see Figure 1, and the gears 30 and 31 to shift to the right. This is due to the inclination of the teeth of the gears 17 and 16 and the inclination of the teeth of the gears 29 and 30. The lateral shifting of the gears 17 and 19 and the gears 30 and 31 will cause a frictional lock between the cone 20 and the cone socket 25 and the cone 34 and the cone socket 39. Hence, these sets of gears will be locked to the casing against rotation, and these gears will revolve only with the casing. Consequently, the axles 6 and 7 will be driven in a clockwise direction, and the vehicle will move forward. When the vehicle is driven in the reverse direction, the same action takes place, only the sets of gears 17 and 19 will shift to the right and the gears 30 and 31 will shift to the left. Thus, both on forward and reverse speeds, the axles 6 and 7 will be driven as a unit. As long as the drive is through the propeller shaft, the axles 7 and 6 will rotate together synchronously, and hence, a drive will be had through both axles when one wheel tends to spin on a slippery surface.

When the vehicle is rounding a corner, then one wheel will rotate faster than the other wheel and at a greater speed than the case 5. Consequently, say that the axle 7 is rotating at a greater speed than the case 5, the drive would then come through the axle 7, gear 16 to gear 17, and owing to the inclination of the teeth 16 and 17, the gears 19 and 17 would be drawn to the right to a neutral position. Gear 16 will drive idle gear 41, gearing 40 and gear 31, which will pull the gears 30 and 31 to the left to a neutral position.

The same action takes place if axle 6 is rotating faster than the case 5 in which instance the drive would be through gear 29 to gear 30, and owing to the inclination of these teeth, gears 30 and 31 would be moved to the left to a neutral position and gear 29 driving idle gears 28 and 27 would allow gear 27 to draw gear 19 to the right to a neutral position. This gives the desired differential between the axles 6 and 7.

If desired, compression springs can be mounted on the ends of shafts 22 and 35 to bear against cones 20 and 21 and cones 33 and 34, and the case 5, so as to have tension against said cones with any desired pressure to facilitate the shifting thereof to a neutral position.

Various changes in details can be made without departing from the spirit or the scope of this invention, but what I claim as new is:

In a differential gearing, the combination of a rotatable casing, a pair of aligned axles having their inner ends rotatably mounted in said casing, a spiral gear secured to the inner end of each axle for rotation therewith, means for rotating the casing, a pair of spiral gears mounted as a unit having oppositely directed teeth, a pair of like spiral gears mounted as a unit having their teeth extending in opposite directions in said casing, means rotatably and slidably mounting each set of gears in said casing, each set of gears having friction cones on the opposite ends thereof, friction cone sockets carried by the casing adapted to receive the cones at certain times, one gear of one set meshing with the helical gear of one axle and one gear of the other set meshing with the helical gear of the other axle, and means operatively connecting the other gear of one set and the other gear of the other set through a separate train of gearing to the spiral gears carried by the axles to set up a driving connection between the sets of gears and axles when the cones are out of engagement with the sockets.

ARTHUR C. ABELT.

REFERENCES CITED

The following references are of record in the file of this patent:

UNITED STATES PATENTS

| Number | Name | Date |
| --- | --- | --- |
| 1,090,082 | Muehl | Mar. 10, 1914 |
| 1,140,312 | Nogrady | May 18, 1915 |
| 2,000,223 | Du Pras | May 7, 1935 |

FOREIGN PATENTS

| Number | Country | Date |
| --- | --- | --- |
| 308,451 | Great Britain | Mar. 28, 1929 |